May 12, 1959    A. L. RIKER, JR    2,885,927
VIEWING APPARATUS
Filed March 21, 1956    5 Sheets-Sheet 1
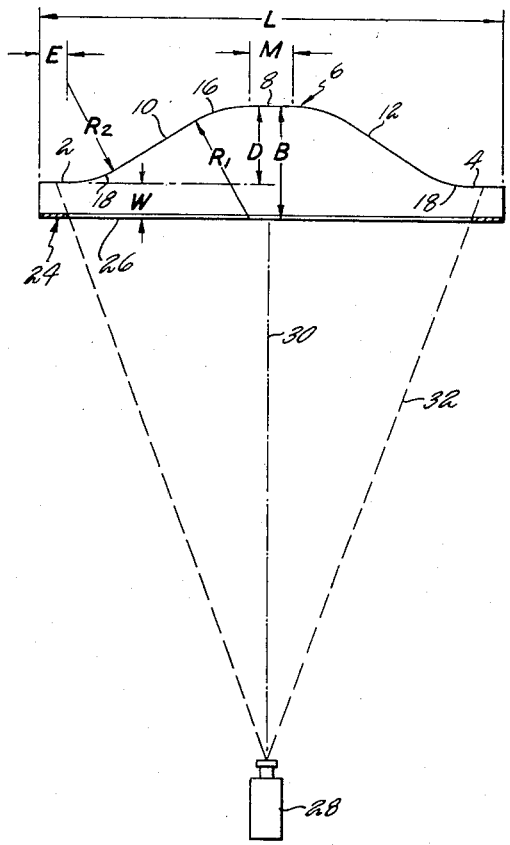
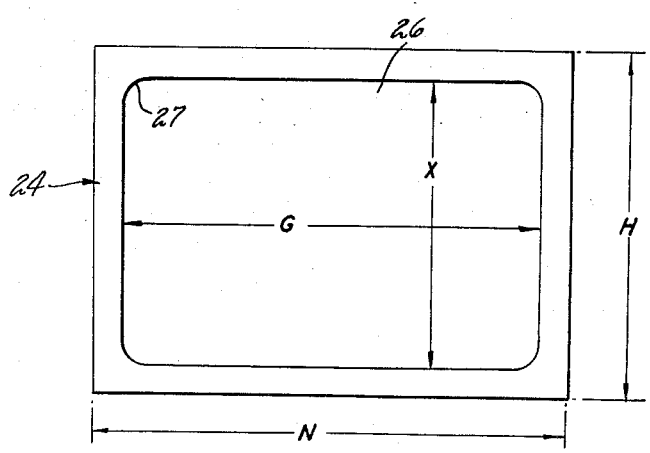
INVENTOR
ANDREW L. RIKER JR.
BY Vernon F. Hauschild
ATTORNEY May 12, 1959     A. L. RIKER, JR     2,885,927
VIEWING APPARATUS
Filed March 21, 1956     5 Sheets-Sheet 2
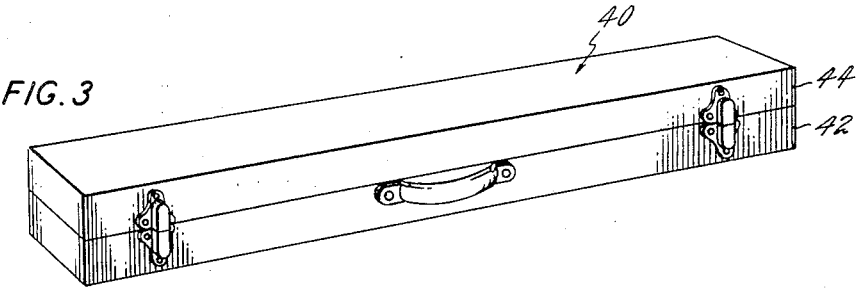
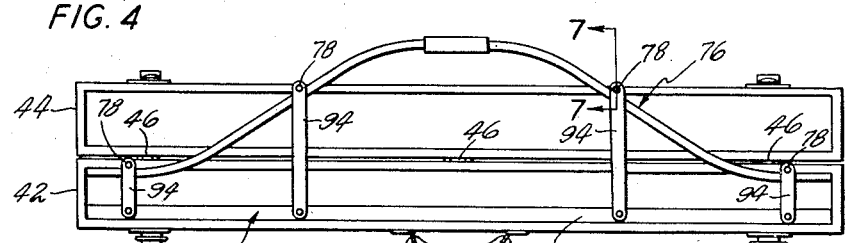
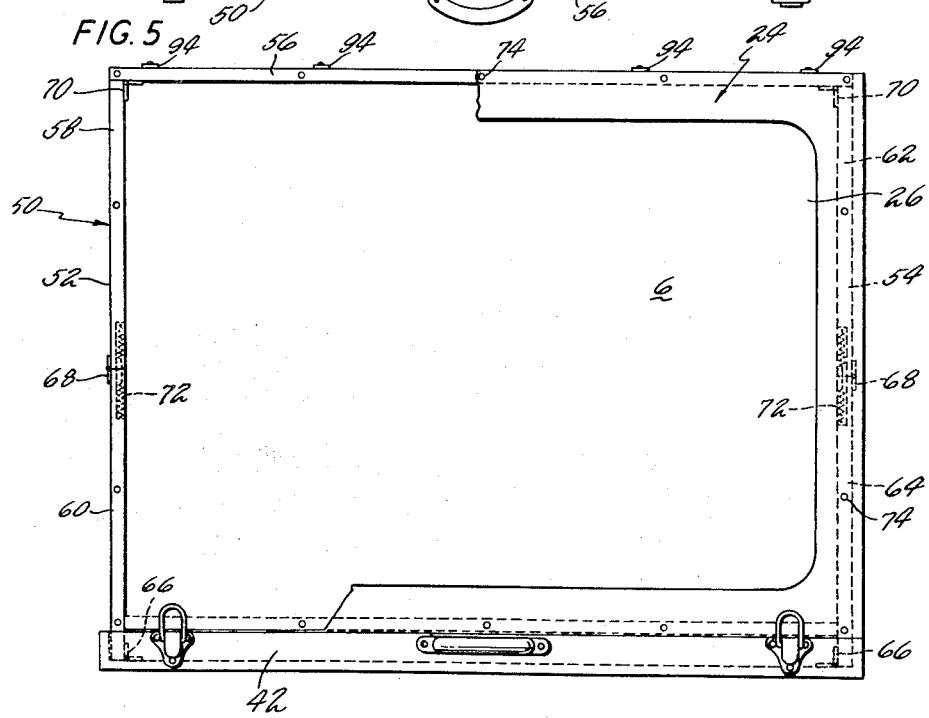
INVENTOR
ANDREW L. RIKER JR.
BY *Vernon F. Hauschild*
ATTORNEY May 12, 1959
A. L. RIKER, JR
2,885,927
VIEWING APPARATUS
Filed March 21, 1956
5 Sheets-Sheet 3
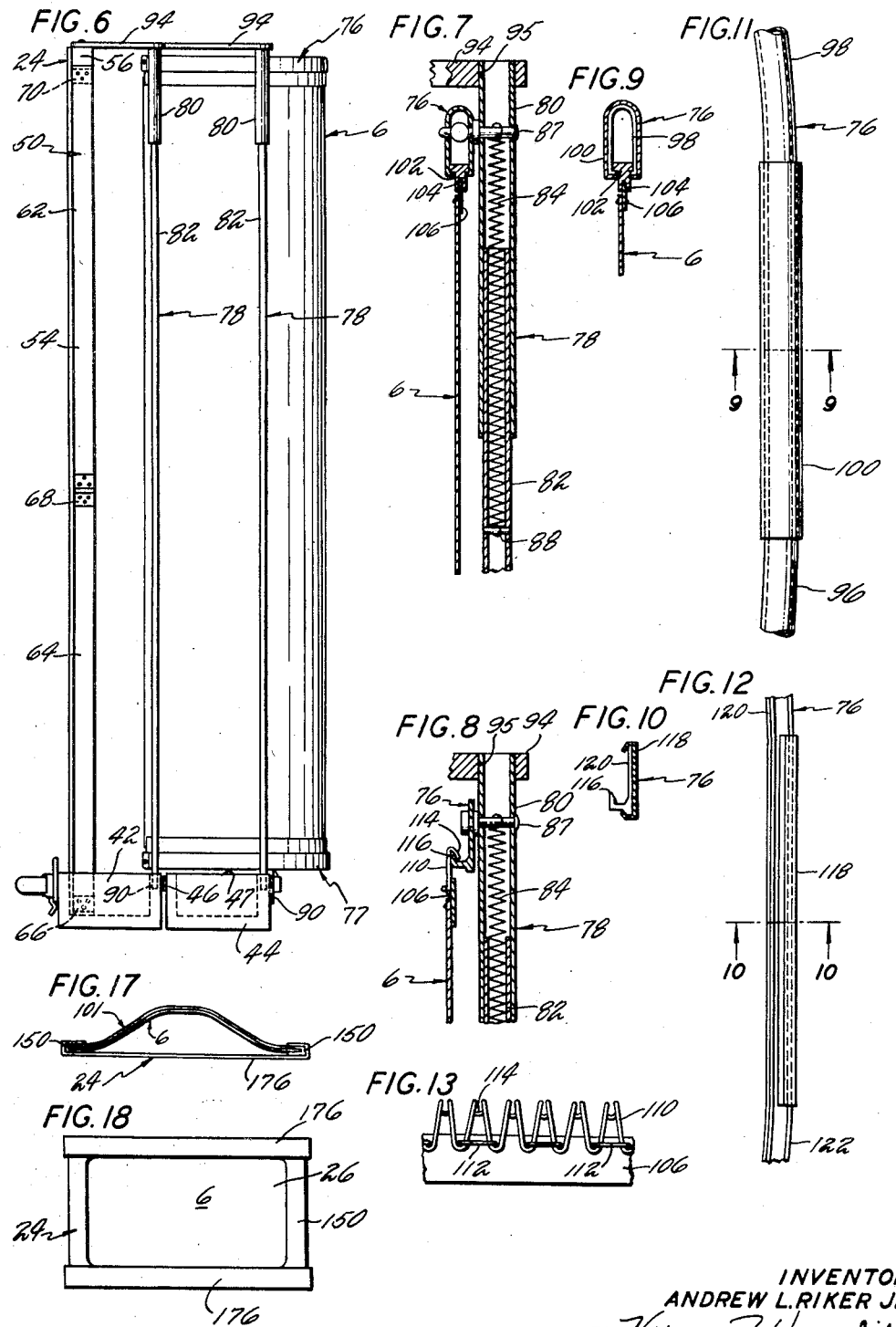
INVENTOR
ANDREW L. RIKER JR.
BY Vernon F. Hauschild
ATTORNEY May 12, 1959 A. L. RIKER, JR 2,885,927
VIEWING APPARATUS
Filed March 21, 1956 5 Sheets-Sheet 4
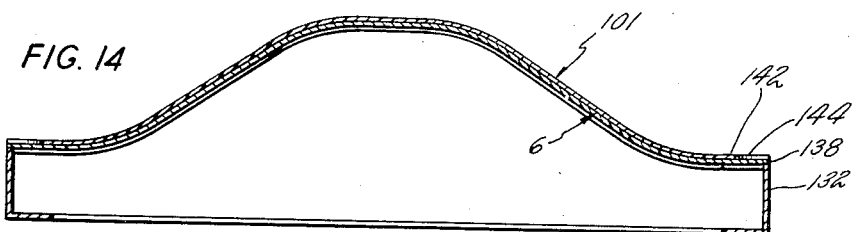
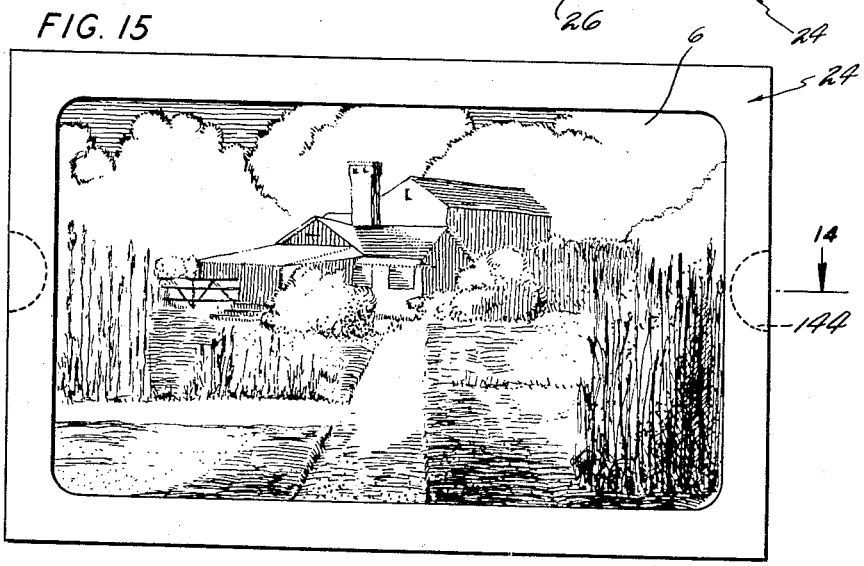
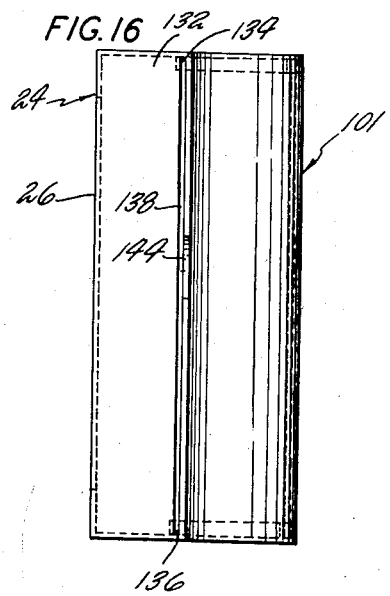
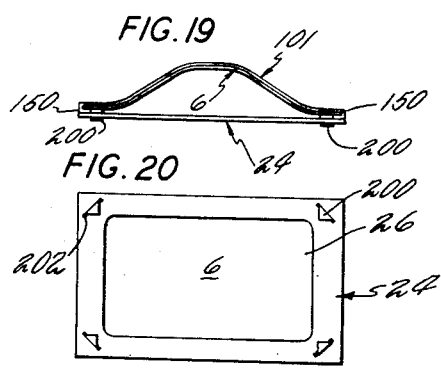
INVENTOR
ANDREW L. RIKER JR.
BY Vernon F. Hauschild
ATTORNEY May 12, 1959     A. L. RIKER, JR     2,885,927
VIEWING APPARATUS Filed March 21, 1956     5 Sheets-Sheet 5

INVENTOR
ANDREW L. RIKER, JR.
BY Vernon F. Hauschild
ATTORNEY

United States Patent Office 2,885,927
Patented May 12, 1959

2,885,927

VIEWING APPARATUS

Andrew L. Riker, Jr., Manchester, Conn.

Application March 21, 1956, Serial No. 572,986

12 Claims. (Cl. 88—28.9)

This is a continuation-in-part of my copending U.S. patent application Serial No. 502,371 which was filed April 19, 1955, now abandoned.

My invention relates to perspective viewing and more particularly to the shape of the viewing surface to effect perspective viewing.

The principal object of my invention is to provide a viewing surface configuration which will provide the visual illusion of "depth," "perspective," or "three dimension" when used with a single lens projector, the picture having been taken with a single lens camera, and to provide a viewing surface and configuration which will provide the illusion of perspective or depth when viewing postcards, photographs, billboards and other displays.

A further object of my invention is to provide a viewing surface having the proper combination of planes and curves and which is properly framed so that the viewer sees in illusion the same natural scene that would be viewed if the actual scene were before him.

A still further object of my invention is to provide a particular embodiment of this surface in the form of a viewing screen for home use which is collapsible, storable and transportable.

A still further object of my invention is to provide viewing apparatus employing my viewing surface which will permit the viewing of postcards, photographs and other reproductions in perspective.

In the picture projection art, curved screens, multi-projection units requiring wide screens and double image projection requiring the use of special viewer glasses, and illuminating effects have been employed in attempts to furnish this "depth," "perspective," "space," "three dimension" or "stereoscopic effect." Each has severe disadvantages which are avoided by applicant's surface configuration. The curved screen alone does not give the desired illusion of "natural" look. Multi-projection units are obviously cumbersome and require special arrangements and synchronization in both the camera work and the projection of the film for viewing. The requirement of glasses for use with the double image projection is found to be unpleasant by the viewing audience. While the illuminating process is claimed to give the illusion of "space," the installation of the necessary lighting equipment is not practical, especially for small home use units.

The use of applicant's viewing or projection screen gives the viewer or audience the illusion of depth perspective or gives the image the desired "third dimension" or natural effect illusion which was originally observed by the camera operator taking the picture; and this natural scene illusion is attainable without the use of any special camera, projector or viewing equipment. Slide transparencies and motion film recorded by a single lens camera and projected by the normal projecting equipment will be seen on applicant's screen with normal perspective or full three dimension effect.

In the past, it has not been possible to view postcards, photographs and other solid reproductions and enjoy the beauty of the illusion of the natural scene which was seen by the person who operated the mechanism to record the scene. My invention, due to the proper surface shape or configuration preferably in combination with proper framing, will give the natural or perspective illusion effect.

Specific embodiments or viewers for use with postcards, photographs and the like will be described later in the specification.

My invention is the result of many years of experience, observation and experiment in the photography field and other closely related fields. This experience caused applicant to realize the deficiencies in existing "three dimension" projection equipment and stimulated experiment to devise and perfect a viewing or projection screen which may be used in homes as well as in theatres and which permits the "three dimension" effect to be obtained using ordinary camera and projection means. After extensively experimenting with various forms of curved screens, it became apparent to applicant that curvature alone will not produce the desired visual illusion of "three dimensions," "depth" or "perspective" in projection.

Although unexpectedly, applicant found that by placing strips of material similar in nature to screen material, a slight distance in front of the screen, the portion of the projected image striking the strip appeared to stand out or away from the rest of the image or picture. This use of a strip closer to the projector than the screen brought applicant to the realization that planes were necessary to the illusion of three dimension.

Applicant first made a multi-vertical strip screen with adjacent strips in different planes but the shadow cast between strip edges caused dark vertical lines or shadows to appear in the image. Through experience in photography and related fields, applicant knew that good photography and stage setting dictates that close side border objects be used. The objects on each side of the scene are chosen to be close to the camera. For this reason, the strip screen was made such that the left border and right border strips were nearest the camera. The multi-vertical strip screen gave the illusion of depth or three dimension but had the above stated shadow problem or disadvantage. The experiment served to prove, however, that planes of projection were necessary to obtain the desired result.

Fig. 1 is a front elevation illustrating a preferred embodiment of my invention.

Fig. 2 is a top plan view of the embodiment of my invention shown in Fig. 1.

Fig. 3 is a perspective view of a screen storage box which would house an embodiment of my invention in the form of a projection screen when the screen and its support are disassembled for storage in the box.

Fig. 4 is a top plan view of the projection screen embodiment of my invention.

Fig. 5 is a front elevation view, partly in section, of the projection screen embodiment of my invention shown in Fig. 4.

Fig. 6 is a side elevation view of the projection screen embodiment of my invention shown in Figs. 4 and 5.

Fig. 7 is a sectional view taken along line 7—7 of Fig. 4 showing one means of attaching the viewing surface to the viewing surface support means.

Fig. 8 is a sectional view taken along line 7—7 of Fig. 4 showing a second means of attaching the viewing surface to the viewing surface support means.

Fig. 9 is a sectional view taken along line 9—9 of Fig. 11.

Fig. 10 is a sectional view taken along line 10—10 of Fig. 12.

Fig. 11 is a partial perspective view of the connection between the viewing surface supporting sections shown in Fig. 6 and Fig. 7.

Fig. 12 is a partial perspective view of the connection between the viewing surface support sections shown in Fig. 6 and Fig. 8.

Fig. 13 is a partial front elevational view of the connecting means between the viewing surface and the viewing surface support means shown in Fig. 8.

Fig. 14 is a sectional view taken along line 14—14 of Fig. 15 for viewing solid surface images such as postcards, photographs and so forth.

Fig. 15 is a front elevation view of a preferred embodiment of my invention for viewing solid surface images such as postcards, photographs and so forth.

Fig. 16 is a side elevation of the embodiment of my invention shown in Fig. 14 and Fig. 15.

Figs. 17 and 19 are top plan views of a second and third embodiment of my invention for viewing solid surface images such as postcards and so forth.

Figs. 18 and 20 are front elevations of the embodiment of my invention shown in Figs. 17 and 19.

Figure 21:
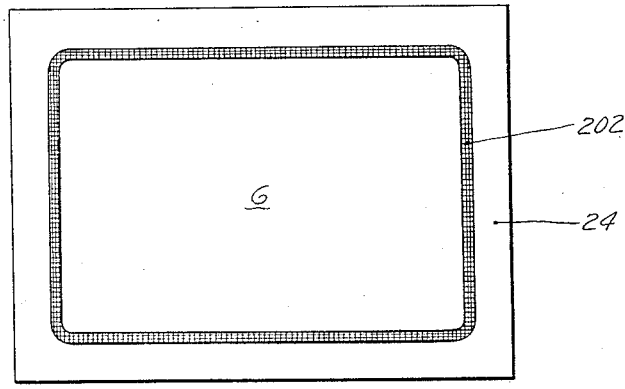
Fig. 21 is a front view of an embodiment of my invention using a translucent viewing screen and a dark inner frame.

The preferred embodiment of my invention, utilizing the multiplane viewing surface principle, is shown in Figs. 1 and 2. My viewing surface 6, onto which images are projected, is shaped so that the left side 2 and the right side 4 of the viewing surface 6 lie in a substantially common plane, which plane is located closer to the viewer than any other portion of the viewing surface 6. The central portion of viewing surface 6 lies in plane 8, which plane is disposed a substantial distance behind or farther from the viewer than the plane in which surface sides 2 and 4 lie. The central viewing surface portion 8 and the side viewing surface portions 2 and 4 are joined by intermediate viewing surface sections 10 and 12, each of which joins viewing surface portion 8 through a large radius concave curve 16 and further join side surfaces 2 and 4 by large radius convex curve 18.

It is obvious, of course, that end portions 2 and 4 could be joined to central portion 8 by smoothly joined concave and convex curves only. Referring again to Fig. 1, we see that frame 24 is spaced a substantial distance "B" in front of viewing surface 6 and has centrally disposed opening 26 through which the projected light rays from the projector 28 pass to reach viewing surface 6 when projections are being viewed or through which the viewer observes solid reproductions such as photographs and postcards. The purpose of frame 24 and its spacing from viewing surface 6 is to cause the viewer or audience to become aware of the association of distance, recess or depth between the frame 24 and viewing surface 6. The mental association of depth which the viewer becomes aware of due to the viewing surface and frame spacing causes him to become further aware of depth in the objects of the image to strengthen the visual illusion of depth or three dimension in the image. While not necessarily so limited, in projection apparatus, frame 24 should be approximately the same color as the screen or some light color so that it will be noticed by the viewer, thereby calling attention to "depth."

It should be borne in mind that the heart of applicant's invention lies in the viewing surface shape preferably with a frame disposed a substantial distance in front of the viewing surface. The viewing surface is so shaped as to present a plurality of planes for the projected image or the photograph type image to be viewed on and with curved viewing surface portions of great radii joining the viewing surface portions lying in planes.

While there are many viewing surface shapes which will give the desired perspective effect utilizing applicant's invention, applicant shows a preferred embodiment in Figs. 1 and 2. While Figs. 1 and 2 show a preferred embodiment, applicant's invention is not necessarily so limited. Since there are a multitude of viewing surface sizes to be considered, applicant must confine his description to relative sizes instead of exact dimensions. The overall width of the viewing surface "L" is 49 units while the depth or distance "D" between viewing surface end or side portions 2 and 4 and central viewing surface portion 8 is 8 units. End portions of the viewing surface 2 and 4 lie in planes substantially perpendicular to the centerline 30 of the projection or viewing pattern 32 and each extends inwardly from the end of screen 6 a distance E which is 3½ units:

Central section 8 of viewing surface 6 lies in a plane substantially parallel to the plane in which side viewing surface portions 2 and 4 lie and therefore, lies in a plane substantially perpendicular to centerline 30 of projection or viewing pattern 32. Centerline 30 approximately bisects central viewing surface portion 8, which extend distance "M," which is 4 units long. Intermediate viewing surface portions 10 and 12 lie in opposed planes and are joined to viewing surface side portions 2 and 4 and central portion 8 by large radius circular viewing surfaces connecting portions 16 and 18, of radii $R_1$ and $R_2$, each of which is about 10 units long and form arcs of large circles which blend tangentially with viewing surface portions 2, 4 and 8.

Referring again to Figs. 1 and 2, we see that frame 24 lies in a plane substantially parallel to viewing surface side portions 2 and 4 and viewing surface central portion 8 and is disposed distance "W" in front of or nearer the projector or viewer than screen sections 2 and 4. Distance "W" is about 3¼ units.

Referring now to Fig. 2, we see that the width of frame 24 is distance N, which is about 50 units, while the height of frame 24 is distance "H," which is about 37 units. Frame 24 is substantially centered with respect to viewing surface 6 and contains centrally disposed opening 26. Frame opening 26 is of distance "G" in width and "X" in height. "G" is 44 units while "X" is 31 units. The corners 27 of centrally disposed opening 26 are of 2½ unit radius. This radius is desirable for proper association and to blend in shape with the normal projected image configuration.

Having described the heart of his invention in completeness, application will now describe some practical embodiments of his invention. First, let us consider the projection arts. Of course, the viewing surface 6 of Figs. 1 and 2 could well be a projection screen, a postcard, a photograph or a display. If a screen, it would serve as a large permanent screen for still or motion picture projections for home or theatre use.

Most projection screens must be easy to assemble and be portable and storable. This is particularly true of home units. Applicant shows such a screen unit embodying his invention in Figs. 3, 4, 5 and 6.

Applicant's portable and storable screen is completely disassemblable so as to be stored in screen box 40, see Fig. 3, which consists of box base 42 and box cover 44 which are rectangular in cross section and held in hinged relation by hinges 46. Top or cover 44 may be "closed" onto base 42 to form a completely enclosed rectangular box 40 of greater length than frame 24 and having sufficient enclosed volume to receive all parts of screen 6 and its supporting apparatus.

As best shown in Fig. 6, box base 42 and box cover 44 are the same height so as to form a platform 47 for the support apparatus for screen 6.

Fabric or viewing frame 24 is supported by support frame 50 which is substantially rectangular in shape and fully collapsible. As best shown in Fig. 5, support frame 50 consists of vertical legs 52 and 54 and horizontal leg 56. Vertical legs 52 and 54 consist of two substantially equal lengthened parts 58 and 60; and 62 and 64, respectively.

Vertical legs 52 and 54 are hinged to the bottom of box base 42 by hinges 66, vertical leg parts 58 and 60; and 62 and 64 are hinged together by hinges 68 and vertical legs 52 and 54 are hinged to horizontal leg 56 by hinges 70. Due to the split in vertical legs 52 and 54 and the hinged relation of the frame parts, support frame 50 can be collapsed into box base 42 as the hinged ends of legs 52 and 54 project inwardly to cause frame 50 to collapse so that the vertical leg parts 58 and 60; and 62 and 64, are aligned in stacked relation with themselves and with horizontal leg 56.

Spring units 72 engage leg parts 58 and 60; and 62 and 64 and are of such length and so located that when frame 50 is in its open or expanded position, they draw the leg parts together to prevent the collapse of frame 50. When it is desired to collapse frame 50, leg parts 58 and 60; and 62 and 64 may be pushed inwardly at hinge 68 to cause spring unit 72 to expand and allow frame 50 to collapse.

Frame 50 is provided with a plurality of attachment units 74 to which fabric frame 24 may be attached or which cooperate with attachment units on frame 24 to attach fabric or viewing frame 24 to support frame 50. Attachment units 74 are so spaced that fabric frame 24 is held in taut or stretched fashion so that it will lie in substantially one plane.

The main purpose of support frame 50 is to support fabric frame 24 a substantial distance in front of screen 6. This spaced relation between fabric frame 24 and screen 6 is best shown in Fig. 4.

Screen 6 is of the usual beaded type, or a fabric which will not reflect light adversely and must be held to the desired multi-plane shape. This is accomplished by supporting the flexible screen material both top and bottom by properly, multiplane, viewing surface shaping supports 76. Shaping supports 76 are formed to the proper screen or viewing surface shape as shown in Fig. 4, and while these shaping supports 76 may be of any convenient cross sectional shape and be received in loop pockets in the top and bottom of screen 6, in common curtain rod fashion, applicant will teach two screen-to-support attachment means which permit faster screen or viewing surface assembly and disassembly. These screen-to-support rod attachment means will be described later so that the description of the screen assembly will not be interrupted here.

Screen support rods or viewing surface shaping supports 76 must be held in proper vertical relation so that screen 6 may later be attached to them. This vertical spacing and support of shaping supports 76 is accomplished by stretcher bars 78. While stretcher bars 78 may be made of simple rods of proper length, applicant prefers to impart an expandability and adaptability to these stretcher bars 78. As best shown in Figs. 7 and 8, stretcher bars 78 consist of two telescoping hollow rods 80 and 82, which are caused to expand in height as a unit by compressed spring 84, which bears against pin 87 of rod 80 and against pin 88 of rod 82. The action of spring 84 is to cause rod 78 to expand to a given length or height and to resist the shortening of rod 78. Should rod 78 be shortened by causing hollow rods 80 and 82 to telescope together, the force of spring 84 must be overcome but this spring force will always be present to cause rod 78 to expand to its original height when the external force is removed or reduced to a value below the force of spring 84. The end of spring 84 is bent over pins 87 and 88 to prevent 80 and 82 from separating. Applicant chooses to use four stretcher bars 78 as best shown in Fig. 4. Each stretcher bar 78 engages a top viewing surface or screen shaping support 76 and a bottom shaping support 77. Stretcher bar 78 may engage support rods 76 and 77 in any convenient manner, and while the invention is not necessarily so limited, applicant shows a quick attachment means in both Figs. 7 and 8.

Stretcher bars 78 are received at their bottom ends in recesses 90 in box 40 and are supported at their upper end by support links 94 which are pivotally attached to horizontal bar 56 of support frame 50. Links 94 have apertures 95 therein to receive the upper end of stretcher bar 78. Links 94 are capable of being pivoted so as to align with support frame 50 for compactness in storing.

With storage box 40 open, with support frame 50 in its expanded position, with stretcher bars 78 supporting screen or viewing surface shaping supports 76 and in turn being supported by recesses 90 in screen box 40 and by links 94, we are ready to assemble screen 6 in position. If we use the screen 6-to-shaping support 76 attachment means shown in Fig. 7, shaping support 76 is made in two telescoping sections 96 and 98, see Fig. 11, in curtain rod fashion with one section, 96 or 98, slightly larger than the other, or, sections 96 and 98 may be made the same size and a joining collar 100 may be attached to either or be a separate piece to receive sections 96 and 98. Sections 96 and 98 may be made of any hollow shape having a downwardly extending opening 102, as best shown in Fig. 9. Sections 96 and 98 receive a T-shaped unit 104 which is part of a normal zipper. A tape 106 is sewed or in some convenient way attached to screen or viewing surface 6. Tape 106 carries the mating zipper pieces to join with zipper part 104 to permit screen or surface 6 to be joined by means of a zipper to support 76. The same attachment means may be made to bottom support 77.

Now referring to Fig. 8, we see that the screen-to-shaping support rod attachment means is somewhat L-shaped in cross section, as best shown in Fig. 10. The support 76 is attached to stretcher bars 78 by pin or other attachment means 87. The upper end of screen 6 is sewed or in other ways attached to tape 106. A plurality of metal hooks 110 are attached to tape 106 by any convenient means such as stitches 112. The screen, tape and hook arrangement is now a permanent integral unit. The hooks 110 have loops 114 which engage lip 116 of support 76 to permit screen 6 to be attached to shaping support 76. The bottom end of screen 6 may be attached to bottom shaping support bar 77 in this or any other manner.

As shown in Fig. 12, support bar 76 of Fig. 8 is made in two pieces and attached in telescoping fashion by connecting collar 118. While shaping support 76 may be fabricated in one piece, it may be advisable to manufacture it into two equal sections 120 and 122, similar to sections 96 and 98 shown in Fig. 11. By making shaping support 76 in two pieces, it may be easily stored in screen box 40 when the screen is to be stored.

When the viewing apparatus shown in Figs. 4, 5 and 6 is to be stored, screen or viewing surface 6 may be unzipped or unhooked from viewing surface shaping support 76. Frame 50 may be collapsed upon itself into box 40, after viewing frame 24 has been disconnected from support frame 50. Hinges 68 permit side sections 58 and 60; and 62 and 64 to fold inwardly upon themselves and hinges 70 permit top support or horizontal bar 56 to rest upon vertical sections 58 and 62. Support links 94 pivot and fold upon horizontal bar 56. Stretcher bars 78 may be laid longitudinally into the bottom of box 40 while shaping supports 76 and 77 may be disconnected at their center and placed in box 40. Screen 6 may be rolled to form a neat roll and be placed in box 40 longitudinally. Viewing frame 24 can be rolled or folded and placed in box 40. In this fashion, all parts of the viewing apparatus have been placed in box 40 and the box may be closed as shown in Fig. 3. The apparatus is then ready for storing.

To assemble the screen from this stored position, box 40 is open so that the bottom 42 and cover 44 of box 40 are lying side by side on a smooth surface so as to provide platform 47 for the screen unit to be built on. Rolled screen 6 and frame 24, stretcher bars 78 and shaping supports 76 are removed from the box 40. Frame 50 is then raised into place by merely raising horizontal bar 56 until sections 58 and 60; and 62 and 64 of vertical bars 52 and 54 are aligned. Stretcher bars may then be placed in recesses 90 of box 40 and in recesses 95 of support links 94. Viewing surface shaping supports 76 and 77 are then assembled into one-piece units and attached to stretcher bars 78 by attachment means 87. The screen 6 is either zipped or hooked to shaping supports 76 and 77 to assume the shape of shaping supports 76 and 77. Viewing frame 24 is then attached to support frame 50 by any convenient means such as snaps or other attachment means 74. The viewing apparatus is now ready for use and slide projections or transparencies or motion pictures may be projected on viewing surface or screen 6.

Now let us consider an embodiment of applicant's invention in a viewing apparatus field other than the projection field. The viewing apparatus shown in Figs. 14, 15 and 16 is one type of apparatus for viewing such articles as photographs, postcards and other solid, flat type of displays. A solid viewing shaping support 101 is made to the shape of a plurality of planes as previously described, may be made of metal, wood, plastics or any solid and shape retaining material. Frame 24 is positioned a substantial distance in front of viewing surface shaping support 101 and formed to the shape previously described.

For purposes of illustration, a photograph is shown as the viewing surface 6 in the viewing apparatus.

Frame 24 and viewing surface shaping support 101 are joined through connecting legs 132.

The postcard, photograph or other viewing surface 6 is caused to assume the shape of viewing surface shaping support 101 by following top downwardly directed groove 134 and bottom upwardly directed groove 136. The photograph or other viewing surface 101 is introduced to the viewing apparatus through slot 138 which is formed by side 132 and the edge 142 of viewing surface shaping support 101. Slot 138 is aligned with both top groove 134 and bottom groove 136 so that after passing through slot 138 the top edge of the postcard or other viewing surface 6 is received and guided in top groove 134 while the bottom edge of the postcard is received and guided in the bottom groove 136. Both top groove 134 and bottom groove 136 assume the shape of viewing surface shaping support 101, for viewing surface shaping support 101 forms one of the runners for both grooves 134 and 136. Due to the stiffness of the photograph or postcard and its support by grooves 134 and 136 and by viewing surface shaping support 101, the postcard or photograph assumes the multi-plane shape of viewing surface shaping support 101.

Finger grips 144 are cut in or are removed from viewing surface support 101 to permit the gripping of the postcard, photograph or other viewing surface 6.

This viewing apparatus permits the viewer to observe the illusion of the natural scene or view which was seen by the camera operator who took the picture.

A different embodiment of this type of viewing apparatus for use with the photograph type of display is shown in Figs. 17 and 18. This type of viewing apparatus is simple in construction and consists of properly shaped viewing surface shaping support 101, which culminates at both ends in a support loop or forwardly directed U-shaped support 150 which runs substantially the full height of the support 101 on each side thereof. Frame and support strips 176 extend across the front of viewing surface support 101 at both the top and bottom of support 101. Strips 176 are attached to U-shaped supports 150 to give rigidity and form or shape stability to viewing surface support 101. Strips 176 and U-shaped support 150 provide substantially the same viewing width to the viewer to form viewing frame 24. Frame 24 may be colored a light color or a second light frame 24 may be attached to supports 150 and strips 176. U-shaped supports 150 support viewing frame 24 in spaced relation to viewing surface 6. To insert postcard or photograph or other viewing surface 6 into the viewing apparatus, the edges of the postcard or other viewing surface 6 are inserted into the U-shaped recesses formed by supports 150 at each side of viewing surface shaping support 101. Because the postcard must rest against and assume the shape of viewing surface shaping support 101, the spacing between the U-shaped supports 150 at each end of postcard or other viewing surface 6 is less than the length of the postcard. During insertion into the viewing apparatus and when both ends of the postcard are received in the pockets of support 150, the postcard is pressed back against viewing surface shaping support 101. The height of viewing surface shaping support 101 is substantially the same as the postcard height.

Figs. 19 and 20 show a still further version of my invention in which the viewing surface support 101 is of one-piece construction and of virtually any material. However, sheet metal is a suggested material. The viewing surface support 101 is shaped as previously described and culminates at both ends in U-shaped supports or grooves 150 which extend vertically to receive the side edges of viewing surface 6. The metal at both the top and the bottom of the free edge of groove 150 is bent outwardly by common pliers or the like to form four outwardly extending triangles of metal 200, which project through slots 202 in viewing frame 24. Tabs 200 are bent back upon frame 24 to connect frame 24 to support 101. Viewing surface or postcard 6 is slid into grooves or supports 150 so that the side edges of the postcard are supported by grooves 150 while the postcard 6 rests against viewing surface support 101 to assume the shape of support 101.

Figure 22:
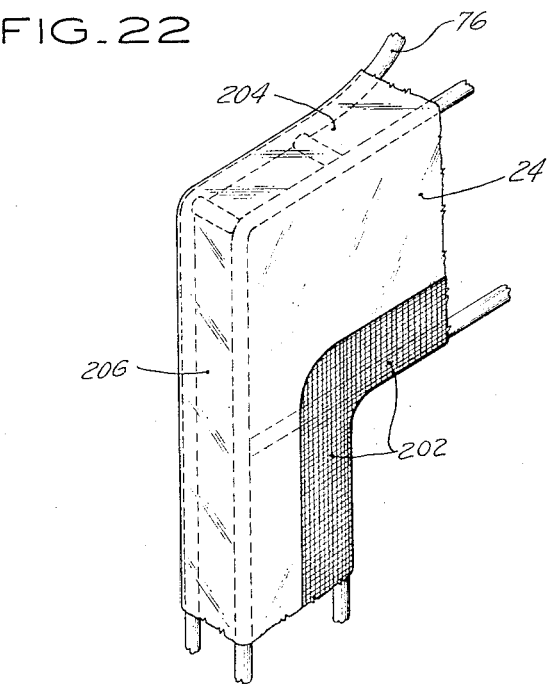
Fig. 22 is a partial perspective view of the embodiment shown in Fig. 21.

Referring to Figs. 21 and 22 we see an embodiment of my projection screen invention in which frame 24 is made of a translucent material so that the light from the projector will reflect from screen 6 and onto the translucent frame to give the frame an illuminated effect. When colored film is used, the color on the screen portion nearest the frame is reflected onto the screen. The illuminated frame tends to attract the viewer's attention to the existence of the frame and cause him to sense "depth" between the frame and the screen, as previously described, and permits somewhat of a reduction in dimension W.

Dark strip, stripe or inner frame 202 is placed about the inner periphery of frame 24 so that the uneven fringe edges of the projected pictures may be absorbed in this inner frame 202 and not reach the screen. While not necessarily so limited inner frame or strip may be black in color.

To prevent dust accumulation, the material from which frame 24 is made, or any other material may be stretched or placed between the support for frame 24 and the support for the screen to cover areas such as 204 and 206.

It will be noted in Fig. 22 that to support frame 24 and screen 6 and to space same, a frame of tubing is used.

While I show preferred embodiments of my invention, it should be realized that my invention may assume several different forms and the following claims should be so construed.

I claim:

1. Viewing apparatus for three dimensional illusion including a multi-plane viewing screen having an image projecting surface for diffusely reflecting an image projected thereon, said surface comprising two side portions lying in substantially the same plane, a central portion located between and in a plane substantially parallel to said side portions and positioned a substantial distance behind said side portions, intermediate portions lying in substantially opposed angle planes and positioned between said side portions and said central portion, and connecting portions smoothly joining said intermediate portions to said side portions and said central portion, a viewing frame positioned in front of said viewing screen and having a centrally disposed opening of such size that substantially all of said projection surface is exposed, and means for supporting said screen and frame in spaced relation.

2. Apparatus as described in claim 1 in which said viewing frame is translucent.

3. Apparatus as described in claim 1 and having an inner frame of dark color positioned about said centrally disposed opening of said viewing frame.

4. Apparatus as described in claim 1 in which said viewing frame is translucent and having an inner frame of dark color positioned about said centrally disposed opening of said viewing surface, and means extending from the outer periphery of said viewing frame to the outer periphery viewing surface to exclude dust from the area therebetween.

5. Viewing apparatus for three dimensional illusion including a viewing screen, at least one screen support member having two side portions lying in substantially the same plane and a central portion located between and in a plane substantially parallel to said side portions and positioned a substantial distance behind said side portions and also having intermediate portions lying in substantially opposed angle planes and positioned between said side portions and said central portion and further having connecting portions of large radii smoothly joining said intermediate portions to said side portions and said central portion, means to support said screen support member, means to attach said viewing screen to said screen support member for substantially the full dimension of said member, a viewing frame positioned in front of said viewing screen and having a centrally disposed opening of substantially rectangular shape and having round corners and being of such size that substantially all of said viewing screen is exposed and means to support said frame in space relation to said viewing screen.

6. Quickly assembled and disassembled viewing apparatus for three dimensional illusion including a viewing screen, a plurality of viewing screen shaping support rods having two side portions lying in substantially the same plane and a central portion located between and in a plane substantially parallel to said side portions and positioned a substantial distance behind said side portions and also having intermediate portions lying in substantially opposed angle planes and positioned between said side portions and said central portion and further having connecting portions of large radii smoothly joining said intermediate portions to said side portions and said central portion, quick-attach means to hold said rods in spaced substantially horizontal relation, means to attach said viewing screen to said rods, a viewing frame positioned in front of said viewing screen and having a centrally disposed opening of smaller area than the area of said viewing screen, and collapsible means to support said frame, means to support said apparatus and into which means said apparatus can be stored when disassembled.

7. Viewing apparatus for three dimensional illusion including a viewing screen, a plurality of viewing screen support rods having two side portions lying in substantially the same plane and a central portion located between and in a plane substantially parallel to said side portions and positioned a substantial distance behind said side portions and also having intermediate portions lying in substantially opposed angle planes and positioned between said side portions and said central portion and further having connecting portions of large radii smoothly joining said intermediate portions to said side portions and said central portion, stretcher bars to hold said support rods in spaced relation, means to support said stretcher bars in substantially vertical positions, means to attach said viewing screen to said support rods for the full length of said support rods so that said viewing screen is stretched between said support rods, a viewing frame positioned in front of said viewing screen and having a centrally disposed opening of smaller area than the area of said viewing screen, and means to support said frame.

8. Viewing apparatus for three dimensional illusion including a top and a bottom viewing screen shaping support each having two side portions lying in substantially the same plane and a central portion located between and in a plane substantially parallel to said side portions and positioned a substantial distance behind said side portions and also having intermediate portions lying in substantially opposed angle planes and positioned between said side portions and said central portion and further having connecting portions of large radii smoothly joining said intermediate portions to said side portions and said central portion, expandable means to support said shaping supports substantially horizontally and in spaced vertical relation, means to support said expandable means substantially vertically, means to attach a viewing screen to said shaping supports for the full length of said shaping supports so that said viewing screen is stretched between said shaping supports, a viewing frame positioned in front of said viewing screen and having a centrally disposed opening of substantially rectangular shape and having round corners and being of such size that substantially all of said viewing screen is exposed and means to support said frame in spaced relation to said viewing surface supports.

9. Viewing apparatus for three-dimensional illusion including a multi-plane viewing screen having a projected image viewing surface which is approximately fifty units wide and thirty-seven units high comprising two side portions lying in substantially the same plane and being approximately three-to-five units wide, a central portion located between and in a plane substantially parallel to said side portions and positioned approximately eight units behind said side portions and being about four units wide, intermediate portions lying in substantially opposed angle planes and positioned between said side portions and said central portion, and connecting portions scribed by radii of about ten units smoothly joining said intermediate portions to said side portions and said central portion, in combination with a viewing frame positioned in front of said viewing screen and having a centrally disposed opening which is approximately thirty-one units high and forty-four units wide.

10. Viewing apparatus for three-dimensional illusion including a multi-plane viewing screen having a projected image viewing surface which is approximately fifty units wide and thirty-seven units high, comprising two side portions lying in substantially the same plane each extending full screen height and being approximately three-to-five units wide, a central portion located between and in a plane substantially parallel to said side portions and positioned approximately eight units behind said side portions and being about four units wide, intermediate portions lying in substantially opposed angle planes and positioned between said side portions and said central portion, and connecting portions scribed by radii of about ten units smoothly joining said intermediate portions to said side portions and said central portion.

11. Viewing apparatus for three-dimensional illusion including a multi-plane viewing screen having a projected image viewing surface comprising two side portions lying in substantially the same plane, a central portion located between and in a plane substantially parallel to said side portions and positioned a substantial distance behind said side portions, intermediate portions lying in substantially opposed angle planes and positioned between said side portions and said central portion, and connecting portions smoothly joining said intermediate portions to said side portions and said central portion.

12. Viewing apparatus for three dimensional illusion including a multi-plane viewing screen having an image projection surface for diffusely reflecting an image projected thereon, said surface comprising two side portions extending the full height of said screen and lying in substantially the same plane, a central portion extending the full height of said screen and located between and in a plane substantially parallel to said side portions and positioned a substantial distance behind said side portions, intermediate portion extending the full height of said screen and lying in substantially opposed angle planes and positioned between said side portions and said central portion, and connecting portions of large radii extending the full height of said screen and smoothly joining said intermediate portions to said side portions and said central portion, a viewing frame positioned in front of said viewing screen and having a centrally disposed opening of such size that substantially all of said projection surface is exposed, and means for supporting said screen and frame in spaced relation.

References Cited in the file of this patent

UNITED STATES PATENTS

| | | | |
|---|---|---|---|
| 956,916 | Wiedersum | May | 3, 1910 |
| 1,229,044 | Davis | June | 5, 1917 |
| 1,315,743 | Raven | Sept. | 9, 1919 |
| 1,395,513 | Owen | Nov. | 1, 1921 |
| 1,662,586 | Newman | Mar. | 13, 1928 |
| 2,060,817 | Mahoney | Nov. | 17, 1936 |
| 2,147,305 | Marten | Feb. | 14, 1939 |
| 2,357,819 | Greer | Sept. | 12, 1944 |
| 2,365,010 | Rogers | Dec. | 12, 1944 |
| 2,369,143 | Hehn | Feb. | 13, 1945 |
| 2,476,521 | Waller | July | 19, 1949 |
| 2,486,206 | Renison | Oct. | 25, 1949 |

FOREIGN PATENTS

| | | | |
|---|---|---|---|
| 6,806 | Great Britain | Oct. | 21, 1915 |
| 541,808 | Great Britain | Dec. | 12, 1941 |
| 919,508 | Germany | Oct. | 25, 1954 |